United States Patent [19]

Kawabata et al.

[11] 4,346,970
[45] Aug. 31, 1982

[54] FOCUS DETECTING DEVICE

[75] Inventors: Takashi Kawabata, Kamakura; Tokuichi Tsunekawa, Yokohama; Kazuya Hosoe, Machida; Takao Kinoshita, Tokyo; Shinji Sakai, Tokyo; Tatsuya Taguchi, Tokyo, all of Japan

[73] Assignee: Canon Kabushiki Kaisha, Tokyo, Japan

[21] Appl. No.: 179,548

[22] Filed: Aug. 19, 1980

[30] Foreign Application Priority Data

Aug. 24, 1979 [JP]  Japan .............................. 54-107728

[51] Int. Cl.$^3$ .............................................. G03B 7/08
[52] U.S. Cl. ...................................................... 354/25
[58] Field of Search ......................................... 354/25

[56] References Cited

U.S. PATENT DOCUMENTS

| | | |
|---|---|---|
| 3,844,658 | 10/1974 | Gela et al. |
| 4,147,417 | 4/1979 | Mandler ............................ 354/25 |
| 4,185,191 | 1/1980 | Stauffer ............................. 354/25 |
| 4,220,406 | 9/1980 | Schaefer ........................... 354/25 |
| 4,240,727 | 12/1980 | Lermann et al. ................ 354/25 |
| 4,246,476 | 1/1981 | Stauffer ............................. 354/25 |
| 4,253,752 | 3/1981 | Ichihara ............................ 354/25 |
| 4,258,989 | 3/1981 | Tokutomi et al. ............... 354/25 |
| 4,265,520 | 5/1981 | Tokutomi et al. ............... 354/25 |

FOREIGN PATENT DOCUMENTS 51-15432 2/1976 Japan .
52-138924 11/1977 Japan .

Primary Examiner—Russell E. Adams
Attorney, Agent, or Firm—Toren, McGeady & Stanger

[57] ABSTRACT

Disclosed is a TTL (Through-The-Lens) type focus detecting device for use in an interchangeable lens-equipped camera, in which a plurality of lenslets are positioned at or near the prescribed focal plane of the objective lens, each of the lenslets is associated with two or more pairs of photosensitive elements. Upon attachment of an objective lens to the camera body, one of the pairs of photosensitive elements for each lenslet is automatically selected to operate on the basis of the dimensions of the used objective lens. The outputs of the selected pairs of photosensitive elements for all the lenslets are processed to detect whether or not a positional difference between two images of an object formed with light beams from the objective lens at respective virtual exit pupils lying in almost symmetry with respect to the optical axis thereof is present, whereby the detection of whether or not the objective lens is in-focus is indicated.

20 Claims, 8 Drawing Figures (a) OBJECT AREAS (b) OBJECT AT P1 (IN-FOCUS CONDITION)

(c) OBJECT AT P2 (FAR FOCUS CONDITION)

(d) OBJECT AT P3 (NEAR FOCUS CONDITION)

FOCUS DETECTING DEVICE

BACKGROUND OF THE INVENTION

1. Field of the Invention

This invention relates to a TTL (Through-The-Lens) type focus detecting device for use in single lens reflex cameras.

2. Description of the Prior Art

It has already been known to provide for optical instruments such as a single lens reflex cameras with so-called TTL type focus detecting devices in various forms. Of these, for example, according to one proposal in Japanese Patent Laid Open Publication No. Sho 52-138924, the objective lens system which is to be focused on an object to be photographed is associated with two lenslets arranged behind a plane equivalent to the focal plane (film plane) in substantially symmetrical parallelism with respect to the optical axis of said objective lens system so that, as a sharp image of the object formed by said lens system changes its position along the optical axis thereof, the positions at which said two lenslets form images are caused to shift relatively in directions substantially perpendicular to the optical axes of the lenslets. By photoelectrically detecting the relative positional relation between the two images formed by the said two lenslets, the focusing condition of the objective lens system to the object to be photographed is assessed. Since this focus detecting device relies not upon a blur of images focused by the objective, that is, the degree of sharpness of the images, but instead upon the extent of relative positional relation between the positions at which the images are formed by the two lenslets, and which is commensurate with the degree of focus of the objective, the various difficult problems which are encountered when the above-described so-called image sharpness sensing type device is put into practice have been eliminated and an advantage of considerably improving the accuracy of focus detection over the so-called image sharpness sensing type device can be expected. In addition thereto, it is also made possible to discriminate with ease whether the out-of-focus condition is due to the far, or near focus.

However, even in such type device, when put it into practice, that is, in order to incorporate it in an instrument, for example, a single lens reflex camera, with the assurance of bringing its functions into full play, there are still many more drawbacks which require improvement. For example, as is understandable from the fact that the above-mentioned conventional proposal applies a simple idea to the positioning of the two lenslets as behind the prescribed focal plane of the objective in parallelism on the opposite side of the optical axis thereof, in parallellism on the opposite side of the optical axis thereof, the use of such focus detecting optical system makes it impossible to limit the light beams incident upon the two lenslets to only those of the beams exiting from the objective which occur at equivalent locations to each other and therefore to always assure what may be called an identity of the two images formed by the respective lenslets. This leads to a drawback wherein the output of the photoelectronic detector is not always sufficiently responsible for the relative change of the focal point of the two images. Another drawback arising from such arrangement of the focus detecting optical system is that the two images formed by the above-described two lenslets are largely affected by a change in the angular field of the objective lens system. This point also contributes to a reduction in the detection accuracy. Still another drawback is that, because said two lenslets tend to mutilate the light beam, or to lower the amount of light, it is made increasingly difficult to maintain the accuracy of focus detection at an acceptable level.

Another aspect of the proposal is that, for the above-described photoelectronic detector, use is made of resistance value change type photoconductive cells, and said photoconductive cells are positioned to receive the images formed by the lenslets, while a change in the difference between the resistance values of the photoconductive cells, that is, balance or unbalance is detected by the bridge circuit. Thus, the positional relationship of the two images, therefore, the focus condition of the objective optical system for the object is detected. However, the use of the only photoconductive cells in such simple way is not sufficient as the detection of a difference in the relative position of the two images is so difficult. Therefore, even with respect to this, a further improvement is desired.

On the other hand, aside from Japanese Patent Laid Open Publication No. Sho 52-138924, according to, for example, Japanese Patent Laid Open Publication No. Sho 51-15432, behind the objective lens system, the image-forming light beam is split off of a portion at each of two positions symmetrical to each other with respect to the optical axis of the system. Then, these portions form images, each on an array of a plurality of photosensitive elements arranged in a plane conjugate to the prescribed focal plane of the objective lens system. Then, the electrical outputs from the two arrays of photosensitive elements are compared with each other to measure the difference in the relative position of the two images formed with the two portions split off the image forming light beam, therefore, the degree of focus of the objective lens system for an object to be photographed.

This or the latter TTL type focus detecting device is, because of its using a plurality of photosensitive elements in sensing each of the two images, superior to the former one in improving the accuracy of focus detection. But, this gives rise to another drawback wherein as the extraction of portions out of the image forming light beam from the objective lens system requires the use of very small reflection mirrors or the like means, it is far more difficult than expected to obtain an image quality good enough to achieve the focus detection. Particularly, the change in the angular field of the objective lens system greatly affects the stability of focus detection. A further problem arises from the loss in the light amount. As a result, it is very difficult to achieve a remarkable improvement of the reliability and accuracy of focus detection.

Although these devices are well suited for adaptation to the focusing of an objective lens of such a single lens reflex camera, the objective lens is generally made interchangeable, and a wide variety of dimensions (namely, focal length, full open F-number, etc.) are available. The camera works with the selective use of a desired interchangeable lens. It is noted here that as the large aperture lenses such as F/1.2, F/1.4, F/1.8 and F/2 are compared with the small aperture lenses such as F/4, F/5.6 and F/8, when to take light beams off the light from the objective lens at two regions lying in symmetry with respect to the optical axis, as has been stated above, while the means for obtaining of such partial light beams is provided in fixed relation to the lens with reference to, for example, a middle aperture value, the use of one of the former or large aperture lenses leads to a relatively smaller interval between the points at which the two partial light beams are taken out, in other words, the sensing points, in relation to the diameter of the aperture opening thereof. On the other hand, the use of the latter or small aperture lens leads to a relatively larger interval between the sensing points in relation to the diameter of aperture opening thereof. Therefore, in the case of the former lenses, the extent to which the relative position of the two images varies as the degree of focusing of the objective lens to the object is made relatively small so that it is difficult to perform focus detection with high accuracy. On the other hand, in the case of the latter lenses, the mutilation of the light beams is made very sensible, and it becomes difficult to obtain a good image quality for focus detection. Therefore, the reliability of focus detection will be largely reduced.

SUMMARY OF THE INVENTION

With the foregoing in mind, the present invention has for its general object the provision of a novel focus detecting device which has overcome all the above-mentioned drawbacks of the conventional device.

That is, in more detail, the present invention has first concern with a type of focus detecting device in which two images of an object to be examined for focus detecting purposes are formed with respective light beams from the objective lens system at two virtual openings lying almost symmetrical with respect to an optical axis thereof, and whether or not a relative shift in position of the two images on the prescribed focal plane of the objective lens is detected as representing the focusing condition of said objective lens. And the object of the present invention is to provide a novel and improved device in which the light intensity distribution of each of the two images sensed can be measured more finely and precisely and the problems arising from the loss of the light amount and the change in the angular field can be avoided, therefore, the detection of whether or not a relative shift in position of said two images is present can be performed with high accuracy, the prerequisite that the state of focus adjustment of the objective lens system be detected with an improved accuracy can be fulfilled. On this account, the present invention makes use of a plurality of lens elements arranged at or near the prescribed focal plane of the objective lens system in combination with a pair of photosensitive elements for each lens element. The outputs of the pairs of photosensitive elements are processed to detect whether or not a relative shift in position of the two images formed with the light beams from the objective lens system at the two virtual openings of almost optical-axis symmetry, as it is commensurate with the degree of focus of the objective lens optical system for the same object. These features constitute the basic form of the present invention.

Another object of the present invention is to provide for a focus detecting device of the character specified above with a more advantageous improvement particularly when adapted to be used in a single lens reflex camera provided with a great number of interchangeable lenses of different dimensions. The selection of one of the lenses for employment on the camera body leads to an automatic establishment of a particular focus detecting mode dependent upon the dimensions of the used lens. Therefore, with any objective lens on the camera body, no matter whatever dimensions it has, it is made always possible to perform focus detection with high accuracy, as a mode most suited for, is selectively rendered operative. Thus, despite the variation of the dimensions of the objective lens in the camera, it is automatically assured that the detection performance is maintained always at a certain level.

To this end, according to a preferred embodiment of the present invention to be more fully described later, while a plurality of lens elements are positioned at or near the prescribed focal plane of the objective lens, each of the lens elements is associated with two or more pairs of photosensitive elements arranged upon attachment of an objective lens to the camera body to be automatically selected one at a time to operate. The outputs of the selected ones of the pairs of photosensitive elements for all the lens elements are later processed to detect whether or not the positional shift of the two images formed with the two light beams from the objective lens at the two virtual openings of almost axis symmetry is present on the above-described focal plane, as the positional shift is commensurate with the out-of-focus condition of the objective lens for the same object. Thus, it is proposed to provide a more advantageous form of a TTL type focus detecting device for a lens interchange type camera.

Still another object of the present invention is to provide a more advantageous and improved form of a focus detecting device capable of assisting the operator in performing focus adjustment of a commonly accepted camera more rationally, or, in simple language, quickly and accurately for a wide range of out-of-focus conditions.

To this end, according to another preferred embodiment of the present invention, a more advantageous form of the focus detecting device is proposed which is characterized in that, while a plurality of lens elements are positioned at or near the prescribed focal plane of the objective lens and each of the lens elements is associated with a plurality of pairs of photosensitive elements, all the pairs of photosensitive elements for each lens element at maximum are previously selected to operate, and the outputs of the photosensitive elements are processed to detect whether or not a positional shift of the two images of an object formed with the two light beams from the objective lens at the two virtual openings lying almost symmetrical with respect to the optical axis thereof, whereby a preliminary or rough detection of whether or not the said objective lens is in focus to the object is effected, and then this result of the preliminary detection is utilized in automatically selecting the one of the pairs of photosensitive elements for each lens element which is attributed to a particular one of the objective lenses of different dimensions to operate, whereby a final or fine detection of whether or not the objective lens is in focus is effected by the use of the outputs of the photosensitive element in that particular pair.

A further object of the present invention is to provide a more advantageous form of a photoelectrical sensing device suited for use in the focus detecting device of the character described above.

To this end, according to a preferred embodiment of the present invention, while the TTL type focus detecting device for use in the interchangeable lens-equipped cameras has a plurality of lens elements positioned at or near the prescribed focal plane of the objective lens and a plurality of pairs of photosensitive elements for each lens elements arranged to be selected one at a time to operate, and the outputs of the selected ones of the pairs of photosensitive elements for all the lens elements are processed to detect whether or not a positional shift of two images of an object formed with two light beams from the objective lens at the respective virtual exit pupils lying almost symmetrical with respect to the optical axis thereof is present whereby the detection of whether or not the objective lens is in-focus to the object is indicated, the photoelectric detector is constructed in the form of a solid state image pick up device, and it is proposed to provide an advantageous form of the solid state image pick up device characterized in that there are provided an array of a plurality of image sensing elements having a similar function to that of the above-described photosensitive elements and capable of a composite of the corresponding number of groups of image sensing elements to the number of used lens elements, each groups consisting of a plurality of pairs of image sensing elements, along with the corresponding number of gate means to the number of pairs of image sensing elements in each group, whereby when the gate means are selectively actuated, one of the pairs of image sensing elements in each group can be selectively read out.

These and other objects, features and advantages of the present invention will become apparent from the following detailed description of embodiments thereof taken in conjunction with the accompanying drawings.

DETAILED DESCRIPTION OF THE PREFERRED EMBODIMENTS

Figure 1:
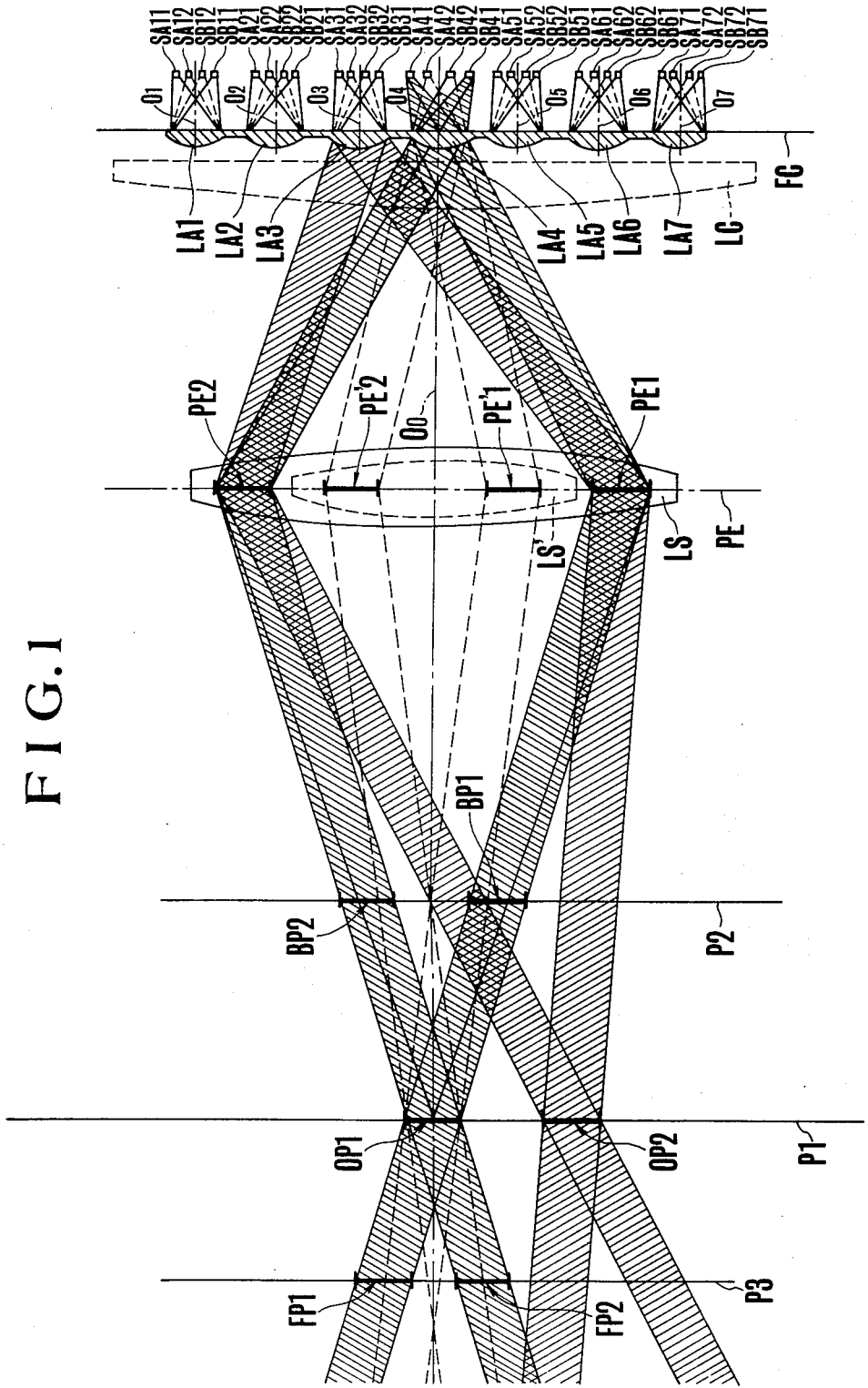
FIG. 1 is a diagram of geometry showing the fundamental arrangement and construction of a focus detecting device for the purpose of explaining improvements of the present invention.

Referring first to FIG. 1, the optical system includes an objective lens LS of a camera and a plurality of (in this instance, seven) lens elements or lenslets LA1 to LA7 positioned in a linear array with their optical axes $0_1$ to $0_7$ almost parallel to an optical axis $O_0$ of the objective lens LS and in a common plane coincident with (or near to) a prescribed focal plane FC of said objective lens LS. It is noted here that these lenslets LA1 to LA7 are formed on a common transparent substrate of synthetic resin (for example, acrylic resin) and though shown in an enlarged scale, are of very small size in an actual practice. Each of the lenslets LA1, LA2, . . . , LA7 is followed by a plurality of (in this instance, two) pairs of photosensitive elements SA11-SB11 and SA12-SB12; SA21-SB21 and SA22-SB22; . . . ; and SA71-SB71 and SA72-SB72. The two photosensitive elements in each pair are positioned almost symmetrical with respect to the optical axis of the associated lenslet, and in a common plane almost coincident with the focal plane of that lenslet, and all the photosensitive elements for each lenslet are spaced from the optical axis of the lenslet by different distances for the different pairs.

The optical arrangement of FIG. 1 is described in greater detail below. Taking an example of the lenslet LAn (n=1, 2, . . . , 7), of the two, or outer and inner pairs of photosensitive elements SAn1-SBn1 and SAn2-SBn2 respectively, one of the outer pair of elements SAn1 and SBn1, or the photosensitive element SAn1 is arranged at a point of position almost conjugate of the lenslet LAn to a virtual exit pupil opening PE1 on a pupil plane PE of the objective lens LS, and the other photosensitive element SBn1 likewise at a point of position almost conjugate of the lenslet LAn to another virtual exit pupil opening PE2 lying almost symmetrical with respect to the optical axis $O_0$ of the objective lens LS. On the other hand, one of the inner photosensitive elements, SAn2 is arranged at a point of position almost conjugate of the lenslet LAn to a virtual exit pupil PE'1 on the pupil plane PE of the objective lens LS, and the other SBn2 likewise at a point of position almost conjugate of the lenslet LAn to another virtual exit pupil opening PE'2 lying in almost symmetry with respect to the above-described first virtual exit pupil opening PE'1. It is to be noted that in order to facilitate the establishment of such conjugate relationship, the array of lenslets LA1 to LA7 are preceded by a field lens LC of relatively weak power as shown by dashed lines in FIG. 1.

In such an arrangement, attention is now paid to all the outer pairs of photosensitive elements SAn1 and SBn1 each in outer side in the two pairs of photosensitive elements SAn1-SBn1 and SAn2-SBn2 for all the lenslets LAn, since the first ones of the photosensitive elements in the outer pairs, SAn1 are made positioned in conjugate relation to the first common virtual exit pupil opening PE1 on the pupil plane PE of the objective lens LS by the optical function of the respective lenslets LAn and the field lens LC, there results that they receive light from the first common virtual exit pupil opening PE1, while since the second ones SBn1 are made positioned in conjugate relation to the second common virtual exit pupil opening PE2 which lies in the same pupil plane PE almost symmetrical to the first one PE1 with respect to the optical axis of the objective lens LS, there also results that they receive light from the second common virtual exit pupil opening PE2. Therefore, now assuming that it happens that an object lies coincident with an object plane P1, and that, at this time, the objective lens LS is focused on the said object plane P1, then, a particular one of the lenslets, for example, LA4 directs light coming from a correspondingly particular minute area of the object, OP1 to the pair of photosensitive elements SA41 and SB41, whereby two images of the common object area OP1 are formed thereon. Again, for example, the lenslet LA3 forms two images of an adjacent common minute object area OP2 on the pair of photosensitive elements SA31 and SB31. And the other lenslets and the outer pairs of photosensitive elements associated therewith have exactly the same phenomenon except for the different object areas. That is, when this is depicted for the relation between the various object areas and the photosensitive elements SAn1 and SBn1, the individual minute object areas C1 to C7 illustrated in portion (a) of FIG. 2 each are aligned with both of the photosensitive elements in the respective individual pair so that the two light receiving regions A1-B1, A2-B2, ..., or A7-B7 are related to each other through the respective object area as illustrated in portion (b) of FIG. 2. It is to be understood from this that the outputs of the photosensitive elements SAn1-SBn1 in each pair are made equal to each other. Thus, the coincidence of the outputs of every pair of photosensitive elements SAn1-SBn1 to each other represents that the objective lens LS comes to a sharp focus condition.

Alternately assuming that while the objective lens LS remains focused on the object plane P1, the object is displaced forwardly of the said plane P1 to a plane P2, (or in far focus condition), then, for example, the pair of photosensitive elements SA41 and SB41 are caused with the one SA41 to receive a light beam from a minute object area BP1, and with the other SB41 to receive a light beam from another minute object area BP2, thereby two images of the different object areas to each other are formed thereon by the common lenslet LA4. And, at this time, the other lenslets cause a similar phenomenon to this to take place on the respective outer pairs of photosensitive elements except that the picked up areas of the object differ from the above. That is, in more detail, as shown in portion (c) of FIG. 2, an image of a particular object area represented by Cn is formed on the SA(n+1)1, and another image of the same object area is formed on the SB(n−1)1.

Conversely when the object is displaced from the above-described object plane P1 backward to a plane P3 (or, in near focus condition), the lenslet LA4 causes the photosensitive elements SA41 and SB41 to receive light beams coming from minute object areas FP1 and FP2 respectively, whereby two images of the different object areas from each other are formed thereon. In more detail, as shown in portion (d) of FIG. 2, two images of one and the same object area Cn are formed on the photosensitive elements SA(n−1)1 and SB(n+1)1 as shifted from the ones SAn1 and SBn1 respectively. It follows that in either of the above two cases the outputs of the two photosensitive elements SAn1 and SBn1 are made to differ from each other, and therefore the inequality of the outputs of the two photosensitive elements in each pair from each other represents an indication of the detection of the fact that the objective lens LS is out of focus.

The foregoing has been described in connection with the one of the two pairs of photosensitive elements SAn1-SBn1 and SAn2-SBn2 for every lenslets LAn which lie at the outer side, SAn1-SBn1. On the other hand, in the case of the pairs of photosensitive elements SAn2-SBn2 which lie at the inner side, all that differs is that the positions of the virtual exit pupil openings are changed from PE1 and PE2 to PE′1 and PE′2 respectively. Therefore, the outputs of each inner pair of photosensitive elements SAn2 and SBn2 can be utilized in detecting whether or not the objective lens LS is in focus.

Now, attention is directed to the interchangeable lens equipped cameras such as single lens reflex cameras. Since there are a great many interchangeable lenses of various dimensions available, assuming here that the camera is equipped with an objective lens of relatively small aperture, for example, as shown by dashed lines LS′ in FIG. 1, then it is obvious that the confine of the location of the virtual exit pupil openings for the relatively small aperture objective lens LS′ to PE1 and PE2 on the pupil plane PE of the objective lens is unreasonable. With the relatively small aperture objective lens LS′, therefore, when the outer pairs of photosensitive elements SAn1-SBn1 are selected to operate, as the light beams to these photosensitive elements SAn1-SBn1 tend to be mutilated, it becomes impossible to perform satisfactory focus detection. To avoid this, it is required to utilize the inner pairs of photosensitive elements SAn2-SBn2 in making focus detection advantageously. The use of a relatively large aperture objective lens as indicated at LS in FIG. 1, on the other hand, as will be understood from the drawing also, allows both of the locations of the virtual exit pupil openings at PE1 and PE2 and at PE′1 and PE′2, so that either one of the outer and inner pairs of photosensitive elements SAn1-SBn1 and SAn2-SBn2 may be selected to operate as far as the reliability of focus detection is concerned. As will be understood by the general theory of geometry, however, the accuracy of focus detection is caused to vary, since the amount of shift of the two images formed with the light beams from the inner virtual exit pupil openings PE′1 and PE′2 is smaller than when the two images are formed with the light beams from the outer virtual exit pupil openings PE1 and PE2, provided that the object is displaced from the plane P1 by an equal distance. Therefore, the selection of the outer pairs of photosensitive elements SAn1 and SBn1 is advantageous in improving the accuracy of focus detection.

In the following, description is made about practical embodiments of the present invention on the basis of such fundamental principle by further reference to FIG. 3 and those that follow.

Figure 3:
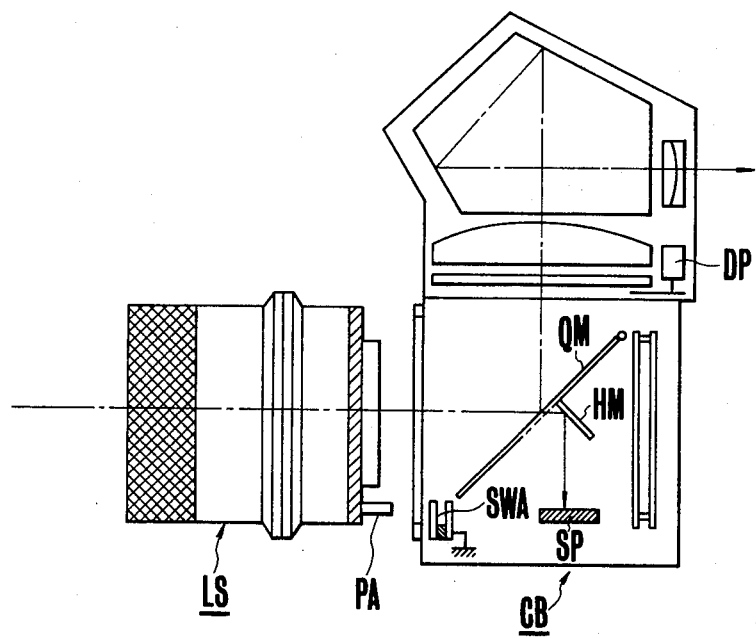
FIG. 3 is a partly elevational sectional view of one embodiment of a focus detecting device according to the principles of the present invention shown in FIGS. 1 and 2 as applied to a single lens reflex camera.

Referring first to FIG. 3, there is shown an example of application of the focus detecting device of FIG. 1 to a single lens reflex camera according to one embodiment of the present invention. For this application, use is made of a switch SWA as is provided in a camera body CB. The operation of the switch SWA is controlled by a full open F-number pin PA extending from the rear wall of a mounting of the objective lens LS when the lens LS is attached to the camera body CB. As is well known, the length of the pin PA depends upon the full open F-number of the objective lens. The larger, the F-number, the longer the length of the pin PA. Such attachment of the objective lens LS to the camera body CB causes the switch SWA to be opened or closed which in turn causes automatic selection of either one of the two pairs of photosensitive elements SAn1-SBn1 and SAn2-SBn2 for each lenslet depending upon the full open F-number of the used objective lens. Thus, the camera is provided with a plurality of (in this instance, two) focus detecting modes automatically switched to take the most suitable one getting used to for each individual interchangeable lens. In FIG. 3, SP is a focus detecting block including the field lens LC, the lenslets LAn and the pairs of photosensitive elements SAn1-

SBn1, SAn2-SBn2 all of which are indicated in FIG. 1. QM is a quick return mirror having a semi-transparent portion; HM is a supplementary mirror for directing the transmitted light to the focus detecting block SP; and DP is an indicator for indicating the focusing condition of the objective lens LS.

Figure 4:
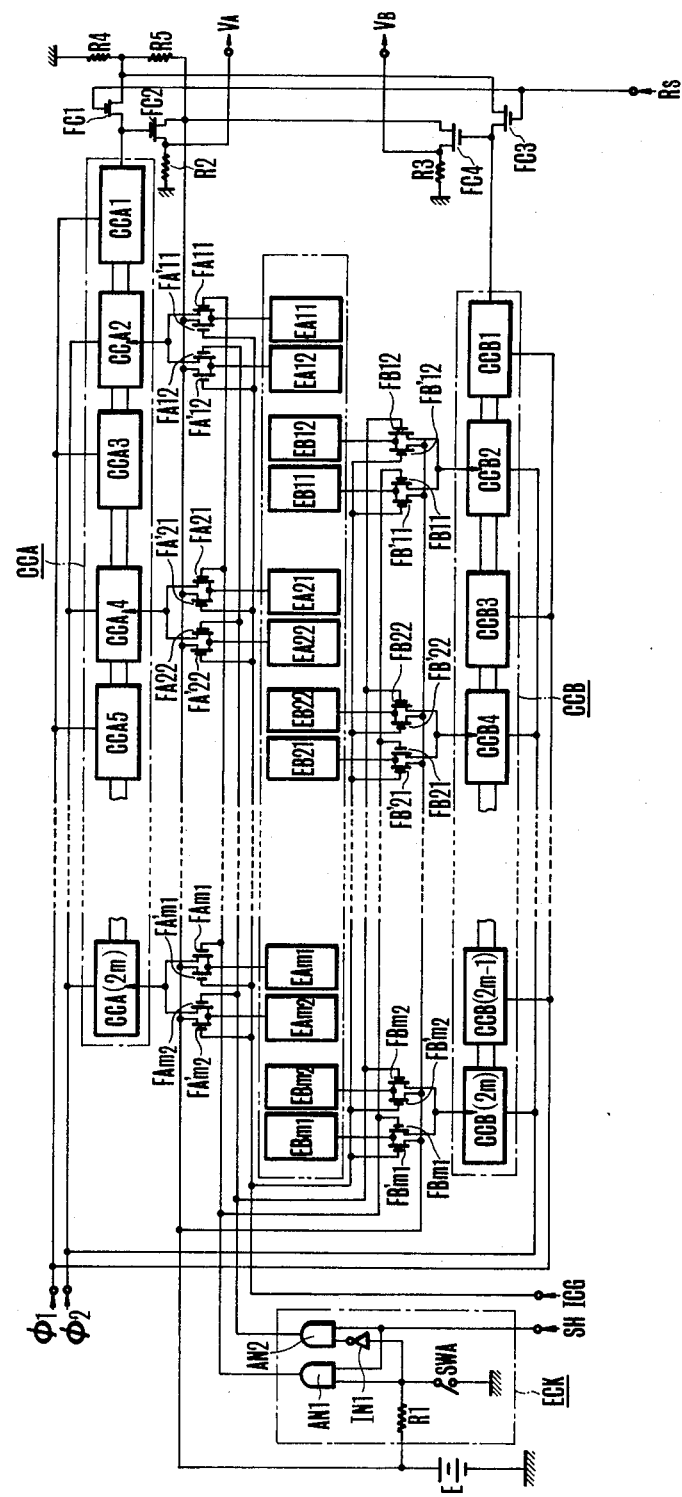
FIG. 4 is an equivalent electrical circuit diagram, partly in block form, of a solid state image pick-up device constituting part of the focus detecting device of the present invention.

The focus detecting device of the present invention can be constructed by the use of a self-scanning type solid state image pick-up device such as CCD photosensor. An example of the solid state image pick-up device is shown in FIG. 4, including a plurality of pairs of image pick-up or sensor elements EA11-EB11, EA21-EB21, ..., and EAm1-EBm1 serving as the outer pairs of photosensitive elements SAn1-SBn1 of FIG. 1, and a plurality of pairs of sensor elements EA12-EB12, EA22-EB22, ..., EAm2-EBm2 serving as the inner pairs of photosensitive elements SAn2-SBn2 of FIG. 1, integration clear gates FA'11, FA'12, FA'21, FA'22, ..., FA'm1, FA'm2 and FB'11, FB'12, FB'21, FB'22, ..., FB'm1, FB'm2 for clearing the charges stored on the individual sensor elements EAn1, EAn2, EBn1 and EBn2 (n=1, 2, ..., m) in response to an integration clear signal ICG (see FIG. 5) fed from the outside, transfer gates FA11, FA21, ..., FAm1 and FB11, FB21, ..., FBm1 connected between the sensor elements EAn1, EBn1 and the even-numbered bits CCA2, CCA4, ..., CCA(2m) and CCB2, CCB4, ..., CCB(2m) of CCD analogue shift registered CCA and CCB, and transfer gates FA12, FA22, ..., FAm2 and FB12, FB22, ..., FBm2 connected between the sensor elements EAn2, EBn2 and the above-described even-numbered bits of said charge transfer CCD analogue shift registers CCA and CCB. These transfer gates are controlled by a gate control circuit ECK comprising AND gates AN1 and AN2, an inverter IN1, a resistor R1 and the above-described switch SWA, these parts being connected to one another as shown in FIG. 4.

Figure 5:
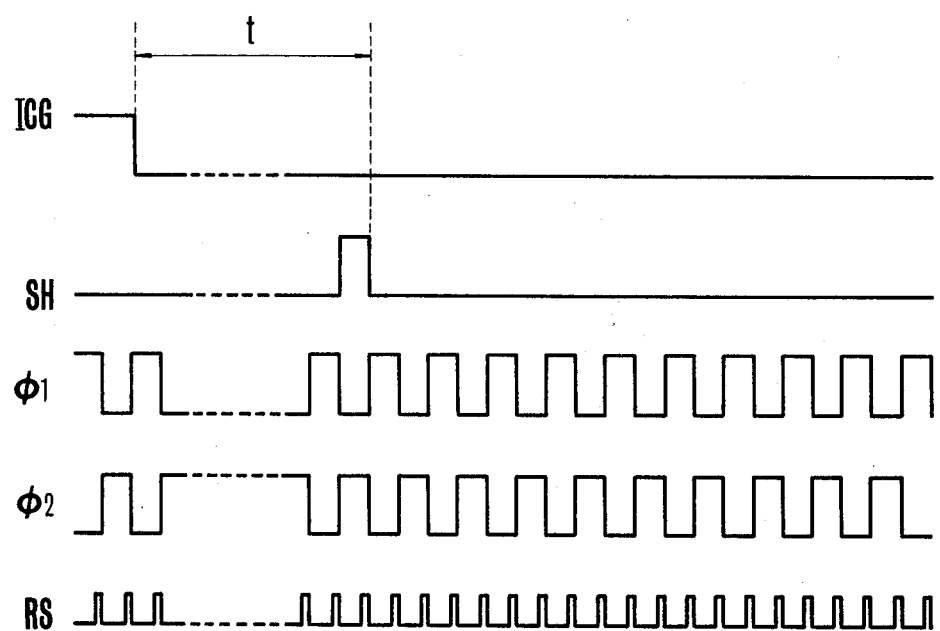
FIG. 5 is a pulse timing chart showing a manner in which the solid state image pick-up device of FIG. 4 operates.

It is noted here that with the focus detecting device designed so that when the full open F-number is equal to or larger than, for example, F/4, or when a relatively small aperture objective lens is in use, the inner pairs of sensor elements EAn2-EBn2 are selected to operate, when an objective lens having a larger full open F-number than F/4 is attached to the camera body CB, the pin PA of the objective lens mounting, because of its having the long length, closes the switch SWA, thereby the AND gate AN1 is disabled and the AND gate AN2 is enabled to produce a shift pulse SH (see FIG. 5). Therefore, the inner pairs of sensor elements EAn2 and EBn2 are read out through the charge transfer CCD analogue shift registers CCA and CCB.

When the objective lens is interchanged with another objective lens having a smaller open F-number than F/4, or a large aperture opening, the pin PA of the latter objective lens, because of its having a short length, allows the switch SWA to open. Therefore, in this case, the AND gate AN2 is rendered disabled, and the AND gate AN1 is rendered enabled to produce the shift pulse SH, causing the outer pairs of sensor elements EAn1-EBn1 to be read out through the charge transfer CCD analogue shift registers CCA and CCB.

The individual stored charges read out in such a manner through the analogue shift registers CCA and CCB are produced as voltage informations VA and VB by a charge-to-voltage converter circuit comprising resistors R3 to R5 and FET's FC1 to FC4, these parts being connected to one another as shown in FIG. 4.

It is to be noted that $\phi 1$ and $\phi 2$ (see FIG. 5) are charge transfer pulses for the CCD analogue shift registers CCA and CCB, and RS (see FIG. 5) is a reset pulse for the charge-to-voltage converter circuit. It is also to be noted in connection with FIG. 5 that a time interval defined by "t" corresponds to an integration period during which information of the object image is integrated and stored in each sensor element EAn1, EBn1, EAn2 and EBn2. It is preferred to adjust the integration period "t" in accordance with the object brightness level. In FIG. 4, an electrical energy source or battery is indicated at E.

According to the combination of the camera of FIG. 3 with the solid state image pick-up device of FIG. 4, for relatively large aperture objective lenses, the outer pairs of sensor elements EAn1-EBn1 are rendered operative, and for relatively small aperture objective lenses, the inner pairs of sensor elements EAn2-EBn2 are rendered operative. Namely, the pairs of sensor elements are selectively rendered operative depending upon the full open aperture size of the used objective lens in response to attachment of the objective lens to the camera body CB, thus enabling the image sensor system to be operated in a most suited mode for the particular dimension of the objective lens. And it is now found that the solid state image pick-up device of FIG. 4 is particularly suited for use as the image receiving means in the focus detecting device which takes the form of FIG. 1, and great advantage can be expected therefrom.

Figure 6:
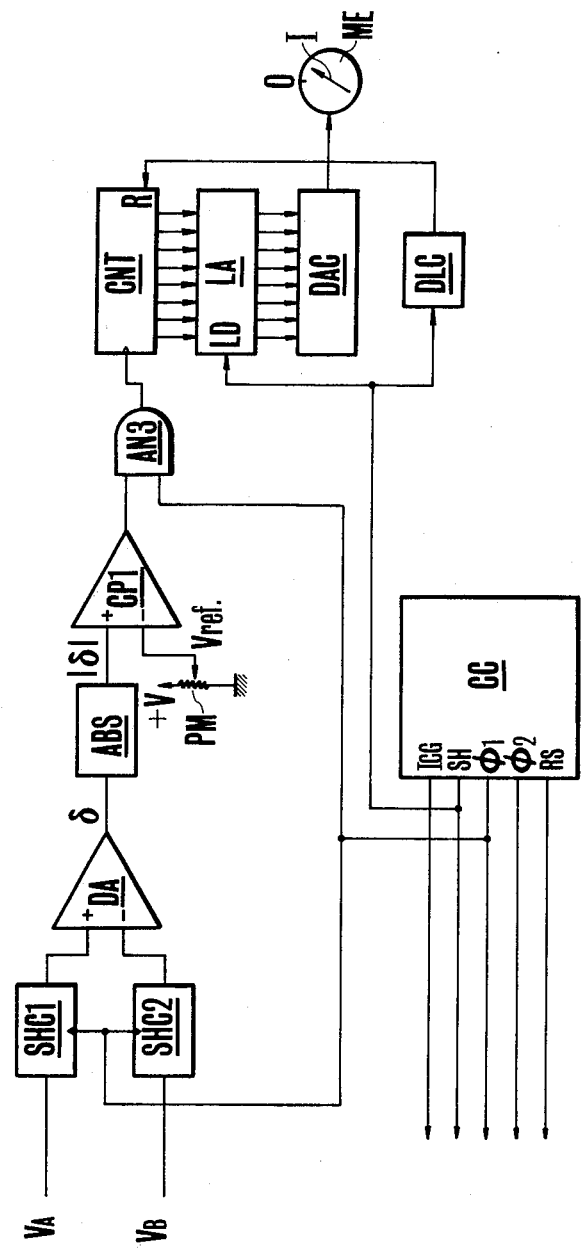
FIG. 6 is a block diagram of an example of a focus detecting circuit usable with the solid state image pick-up device of FIG. 4.

Next, explanation is provided concerning an example of a focus detecting circuit applicable to a case where, for the image receiving means, use is made of such solid state image pick-up device as shown in FIG. 4 by reference to FIG. 6.

Figure 2:
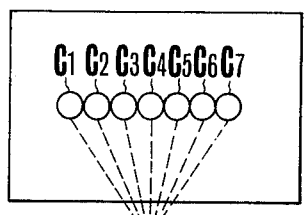
FIG. 2 is a schematic view showing shifts of object areas imaged on a particular pair of photosensitive elements with the change of focusing condition of the objective lens for the purpose of explaining the principles of the detection of whether or not the objective lens is in-focus based on the system of FIG. 1.
Figure 2:
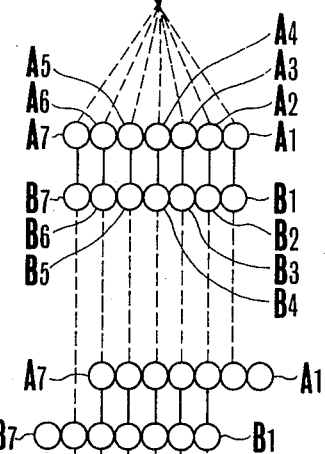
Figure 2:
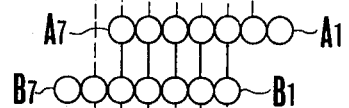
Figure 2:
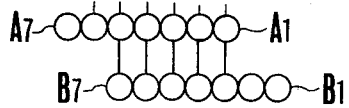

This example of the focus detecting circuit shown in FIG. 6 is designed by taking into account the fundamental principle explained in connection with FIGS. 1 and 2 to detect the magnitude of the positional difference between the two images formed with the two light beams from the objective lens LS (LS') at the two virtual exit pupil openings PE1 and PE2 (PE'1 and PE'2) lying in symmetry to each other with respect to the optical axis thereof, on the prescribed focal plane FC.

In FIG. 6, SHC1 and SHC2 are sample and hold circuits for sampling and holding the outputs VA and VB of the solid state image pick-up device of FIG. 4 respectively, to each of which the charge transfer pulse $\phi 1$ as a sampling pulse is applied from a control circuit CC. (That is, as will be understood from the construction of the solid state image pick-up device shown in FIG. 4 it is here assumed that the outputs VA and VB from the said solid state image pick-up device are read in synchronism with the charge transfer control pulse $\phi 1$). DA is a differential amplifier for detecting a difference $\delta$ between the outputs of these sample and hold circuits SHC1 and SHC2; ABS is an absolute value-deriving circuit for converting the output $\delta$ of the said differential amplifier DA to an absolute value $\equiv |\delta|$; CP1 is a comparator for comparing the output $|\delta|$ of said absolute value-deriving circuit ABS with a predetermined reference voltage +Vref. as the output of a potentiometer PM upon occurrence of $|\delta| > +$Vref., as is here assumed, to produce a signal of high level. It should be pointed out here in connection with the solid state image pick-up device of FIG. 4 that when the difference between the outputs of the sensor elements paired up with each other in EAn1-EBn1 and EAn2-EBn2, or $|\delta|$, is equal to or lower than +Vref., (at this time, the output of the comparator CP1 becomes low level), the outputs of the both elements are assumed to be coincident with each other. When the difference $|\delta|$ is larger than the +Vref., (at this time, the output of the comparator CP1 becomes high level), the outputs of the both elements are assumed to differ from each other. By the way, the value of +Vref. is determined eventually by taking into account the tolerances of the circuit and the like. AN3 is an AND gate receptive of the output of said comparator CP1 and the charge transfer control pulse train $\phi 1$ for translating the one of the outputs of the comparator CP1 which occurs when the outputs of the both elements in each pair differ from each other to a number of pulses $\phi 1$. Therefore, this number corresponds to the number of pairs of sensor elements, the difference $|\delta|$ between the outputs of which is larger than the +Vref., that is, the outputs of which are found to be different from each other. CNT is a counter for counting the number of output pulses from said AND gate AN3, that is, the number of pairs of sensor elements of which the outputs differ from each other; LA is a latch circuit responsive to the shift phase SH from the control circuit CC for storing or latching the output of said counter CNT. It should be pointed out here that the output of the said latch circuit LA represents the number of pairs of sensor elements of which the outputs differ from each other, therefore, as will be understood from the fundamental principle explained in connection with FIGS. 1 and 2, the positional difference between the two sensed images due to the two light beams from the objective lens LS (LS') at the two virtual exit pupil openings PE1 and PE2 (PE'1 and PE'2) lying in symmetry to each other with respect to the optical axis, on the prescribed focal plane FC. DAC is a digital-to-analogue converter for converting the output of said latch circuit LA to an analogue signal; ME is a meter as an indicating means connected to the output of said D/A converter DAC. In this case, the positional difference between the above-described two images sensed on the prescribed focal plane FC is measured by the deflected position of a pointer I of the meter ME.

It is noted that DLC is a delay circuit for delaying the shift pulse SH from the control circuit CC by a predetermined very short time, and its output is applied to said counter CNT to reset the same.

Now, according to such construction of the focus detecting circuit, as has been mentioned above, the detection of the positional difference between the two images formed with the two beams of light from the objective lens LS (LS') at the two virtual exit pupil openings PE1 and PE2 (PE'1 and PE'2) lying symmetry to each other with respect to the optical axis on the prescribed focal plane FC is indicated by the deflection of the pointer I of the meter ME. Therefore, when the objective lens LS (LS') is adjusted in a position so as to bring the point I of the meter ME to null, as then the positional difference between the two images sensed on the prescribed focal plane FC is reduced to zero, there results that the said objective lens LS (LS') is sharply focused right on the object. Thus, focusing of the objective lens LS (Ls') can be performed quickly and with ease by the help of the pointer I of the meter ME.

Further improvements of the present invention will next be described by reference to FIGS. 7 and 8.

Taking an example of the relatively large aperture objective lens LS of FIG. 1, on the assumption that the outer and inner pairs of virtual exit pupil openings PE1, PE2 and PE'1, PE'2 in the pupil plane PE are made effective at a time, it follows that, on the prescribed focal plane FC, the relative shift amount of the two images due to the two light beams from the inner pair of virtual exit pupil openings PE'1 and PE'2 is far smaller than that of the two images due to the two light beams from the outer pair of virtual exit pupil openings PE1 and PE2 for the same defocus condition, as will be understandable by the theory of geometry also. This implies that the utilization of this inner virtual exit pupil openings PE'1 and PE'2, that is, in other words, the inner pairs of photosensitive elements SAn2-SBn2 (or, in view of the solid state image pick-up device of FIG. 4, the inner pairs of sensor elements EAn2-EBn2) leads to the possibility of sensing the image shift in an extended range.

With such consideration in mind, particularly when an objective lens which has a relatively large aperture opening is used, the sensor system may be operated, for example, in a mode such that the inner pairs of photosensitive elements are first rendered operative to effect a preliminary rough focusing, and after the degree of defocus is reduced below a predetermined level, the outer pairs of photosensitive elements take getting switched to, thereby it being made possible to perform focusing with high reliability and high accuracy despite the wide range of defocusing.

Figure 7:
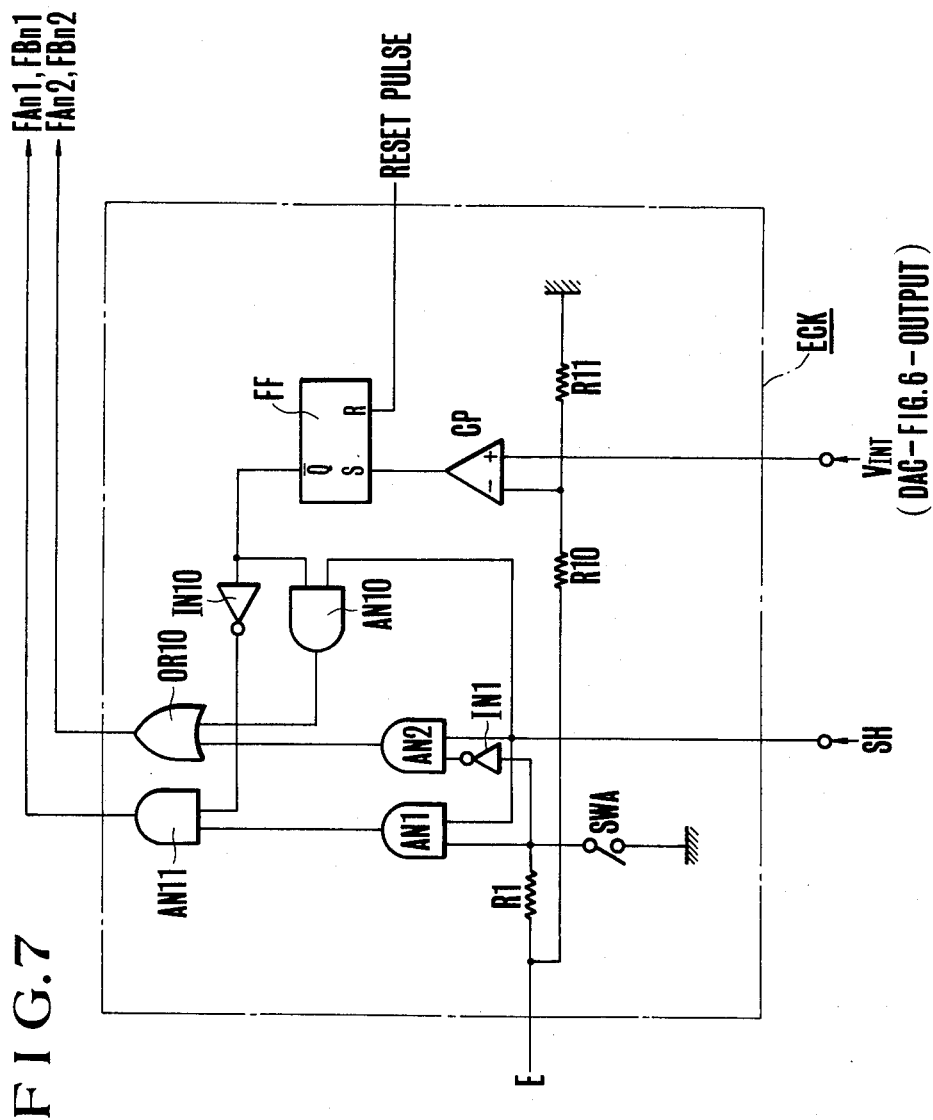
FIGS. 7 and 8 are fragmentary circuit diagrams showing other two different examples of the gate control circuit in the solid state image pick-up device of FIG. 4.

To put it into practice, the charge transfer gate control circuit ECK of FIG. 4 may be modified as shown in FIG. 7 with addition of resistors R10 and R11, a comparator CP10, a flip-flop FF as a memory element, AND gates AN10 and AN11 and an OR gate OR10. In operating the circuit of FIG. 7, since the positive input terminal of the comparator CP10 is fed with, for example, the output of the D/A converter DAC of FIG. 6, that is, a voltage $V_{INT}$ corresponding to the degree of defocus, that is, the amount of the positional difference between the above-described two images, when said input $V_{INT}$ is lowered below a certain level determined by the resistors R10 and R11, said comparator CP10 changes its output from high to low level at which the flip-flop FF is set with the change of its Q output to low level. This output after having inverted by the inverter IN1 is applied to the AND gate AN11 at one input thereof. Since the switch SWA is OFF when a large aperture objective is equipped, the input $V_{INT}$ of relatively high level causes the comparator CP10 to produce an output of high level, and therefore the flip-flop FF is not set. Because of its Q output of high level, the shift pulse SH is applied through the AND gate AN10 and OR gate OR10 to the transfer gates FAn2 and FBn2, thereby the stored charges of the inner pairs of sensor elements EAn2 and EBn2 are read out through the charge transfer CCD analogue shift registers CCA and CCb.

As the objective lens approaches a sharper focus condition, when the level of input $V_{INT}$ lowers below the above-described certain reference level, the output of the comparator CP10 is changed from high to low level. Then, the flip-flop FF is set and its Q output is changed to low level. At this time, the AND gates AN1 and AN11 are enabled to apply the charge transfer control pulse SH to the transfer gates FAn1 and FBn1, thereby the stored charges of the outer pairs of sensor elements EAn1 and EBn1 are read out through the analogue shift registers CCA and CCB.

It is to be noted that when a small aperture lens is equipped, the switch SWA is turned on so that regardless of the input $V_{INT}$, the shift pulse SH is always applied to the transfer gates FAn2 and FBn2 through the AND gate AN1 and OR gate R10, and therefore that the inner pairs of sensor elements EAn2 and EBn2 are always utilized.

The flip-flop FF is reset after the completion of one focus detecting operation, for example, in response to actuation of a shutter release of the camera.

Figure 8:
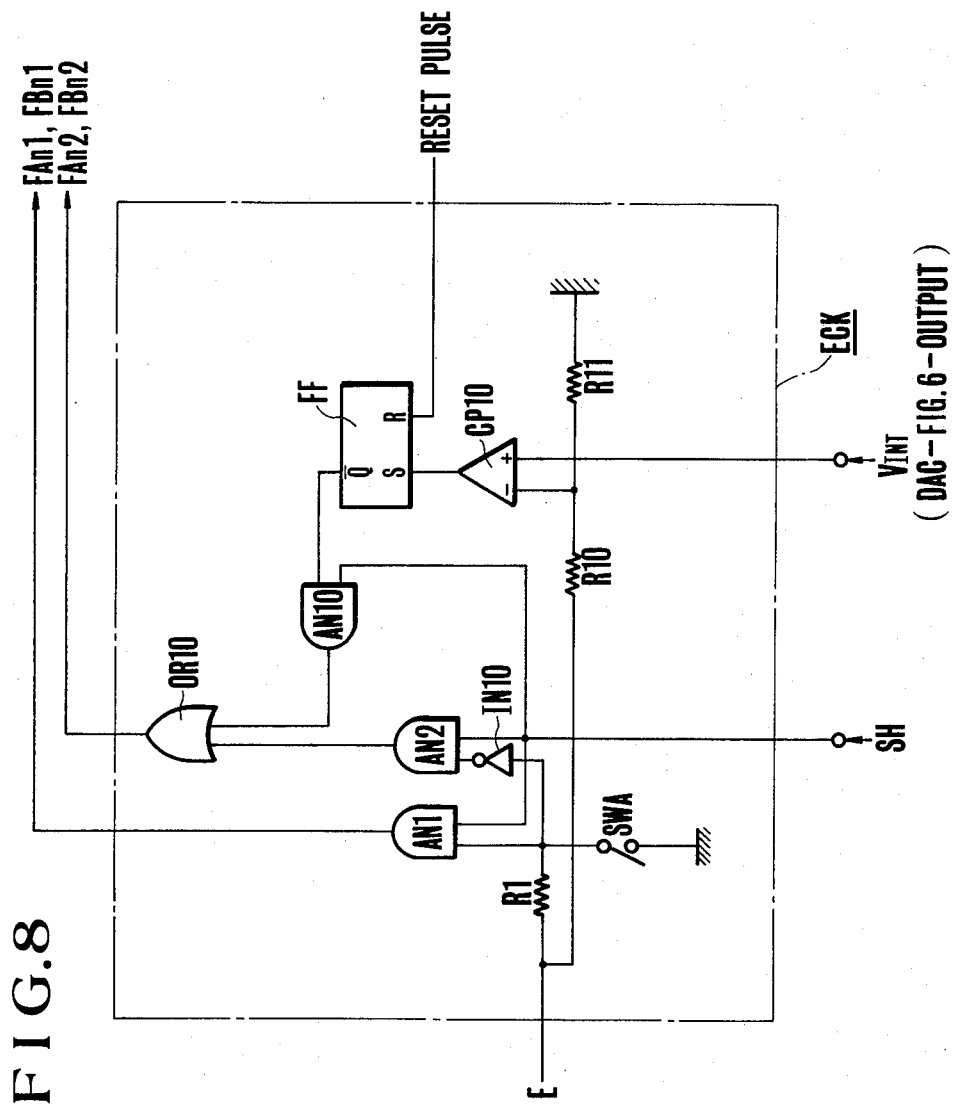

Another example of modification of the charge transfer gate control circuit ECK is shown in FIG. 8, as is derived from the circuit of FIG. 7 with exclusion of the AND gate A11 and inverter IN10. When a large aperture lens is equipped, and when the input $V_{INT}$ is of relatively high level, the AND gate AN1 and OR gate OR10 pass the shift pulse SH therethrough to all of the transfer gates FAn1, FBn1, FAn2 and FBn2 simultaneously, thereby both of the outer and inner pairs of sensor elements EAn1, EBn1, EAn2 and EBn2 are all utilized simultaneously so long as focusing of the objective lens is rough, or the input $V_{INT}$ takes relatively high level. Then, when the focusing transits from the rough to the accurate, or when the input $V_{INT}$ lowers below said certain reference level, the output of the comparator CP10 is changed from high to low level, causing the flip-flop FF to be set. Since its Q output becomes low, the transfer gates FAn1 and FBn1 only are fed with the shift pulse SH. From this time onward, the focus detection is performed under the use of the outer pairs of sensor elements EAn1 and EBn1 alone.

Thus, the sensor system is enabled by the charge transfer gate control circuits of FIGS. 7 and 8 to be operated in such modes that particularly when a large aperture objective lens is selected for use in the camera, since the lens is largely out of focus, the focus detection starts under relatively rough precision, and after the lens nears a sharp focus position, proceeds at this time under finer precision with the advantage that the objective lens can be brought into an in-focus position from largely defocused positions quickly and with high accuracy.

It will be seen from the foregoing that according to the present invention, the TTL type focus detecting device in which two images of an object are formed with two beams of light from the objective lens at two virtual exit pupil openings lying almost symmetrical to each other with respect to the optical axis thereof and are compared with each other for detection of the presence or not of a positional difference thereof as sensed on the prescribed focal plane which is commensurate with whether or not the objective lens is out of focus for the same object, and which is adapted to be used particularly in an interchangeable lens-equipped camera, is enabled to be operated in many modes which are automatically selected as the most suitable one for the particular dimension of the objective lens used. Therefore, no matter what dimension it may have, the objective lens can be always focused with high reliability and high accuracy. The improvements proposed in connection with FIGS. 7 and 8 meet the demand of quick and accurate focusing in largely defocused situations.

Further advantages can be expected from the use of a solid state image pick-up device as the image receiving means in the TTL type focus detecting device for interchangeable lens-equipped cameras as is proposed in connection with FIG. 4. Though the image pick-up device is shown as a CCD photosensor, otherwise use may be made of MOS image sensor (MOS photodiode array), or BBD photosensor.

Another variation may be made. For example, though the foregoing embodiments have been described as using two pairs of photosensitive elements for each lenslet, the present invention is not confined to this number. It is of course possible to increase this number into three or more with an advantage that the performance of the focus detecting device is improved as the number of modes is increased with respect to a more fine classification of the dimensions of interchangeable lenses available. In this case, it is preferable to use a semiconductor device such as an ROM for selective operation of the great number of pairs of photosensitive elements for every lenslet, since the construction of the selector circuit can be largely simplified.

What is claimed is:
1. A TTL type focus detecting device comprising:
a plurality of lens elements positiioned at or near a plane corresponding to a prescribed focal plane of an objective lens;
a plurality of pairs of photosensitive elements corresponding to each of said lens elements;
means for automatically selecting at least one of the pairs of said photosensitive elements corresponding to each of said lens elements; and
circuit means receptive of the outputs of said selected ones of the pairs of said photosensitive elements for detecting whether or not a positional difference is present between two images of an object formed on said plane with two light beams from said objective lens at two virtual exit openings lying almost symmetrical to each other with respect to an optical axis thereof, said circuit means producing an output indicative of whether or not said objective lens is in a sharp focused condition on said object; said automatically selecting means being responsive to an output of said circuit means and making said selection on the basis of said output.

2. The focus detecting device according to claim 1, wherein the photosensitive elements in each of said plurality of pairs are arranged almost symmetrical to each other with respect to an optical axis of the corresponding one of said lens elements and at different distances therefrom with the different pairs.

3. The focus detecting device according to claim 2, wherein said selecting means is responsive to a large aperture objective lens to automatically select the ones of the plurality of pairs of the photosensitive elements which lie at the outer side and responsive to a small aperture objective lens to automatically select the ones of the plurality of pairs of the photosensitive elements which lie at the inner side.

4. The focus detecting device according to claim 1 or claim 2 or claim 3, wherein said photosensitive elements are constructed in the form of sensing elements in a solid state image pick-up device, and the outputs of said sensing elements can be selectively taken out by said selecting means so that the ones of the pairs of said photosensitive elements for all said lens elements are selectively read out.

5. The focus detecting device according to claim 4, wherein those of said sensing elements which correspond to said plurality of pairs of the photosensitive elements are preliminarily specified, and the plurality of pairs of the sensing elements each are provided with a respective gate means, said gate means being selectively rendered operative by said selecting means to selectively read out the plurality of pairs of the sensing elements for each lens element by one pair at a time.

6. A TTL type focus detecting device comprising:
a plurality of lens elements positioned at or near a plane corresponding to a prescribed focal plane of an objective lens;
a plurality of pairs of photosensitive elements corresponding to each of said lens elements; and
circuit means operating in two steps of:
preliminarily selecting at maximum all the pairs of the photosensitive elements for every lens element to detect whether or not a positional difference is present between two images of an object formed on said plane with two beams of light from said objective lens at two virtual exit pupil openings lying almost symmetrical to each other with respect to an optical axis thereof, so that a preliminary detection of whether or not said objective lens is focused on said object is performed; and
utilizing the result of this preliminary detection in automatically selecting particular ones of said plurality of pairs of photosensitive elements for every lens element for one and the same dimension of the objective lens, so that the outputs of said particular ones of the pairs of photosensitive elements are utilized in performing a final detection of the focusing condition of the objective lens.

7. The focus detecting device according to claim 6, wherein said photosensitive elements in each of said plurality of pairs are arranged almost symmetrical to each other with respect to an optical axis of the corresponding one of said lens elements and at different distances therefrom with different pairs.

8. The focus detecting device according to claim 7, wherein said circuit means is arranged to operate in such a manner that the ones of said plurality of pairs of photosensitive elements for every lens elements which lie at the inner side, are first selected for the preliminary detection of whether or not a sharper focus condition is attained, and then this result of preliminary detection is utilized in automatically selecting to the ones of said plurality of pairs of the photosensitive elements which lie at the outer side, so that the output of the outer pairs of the photosensitive elements are utilized in performing the final detection of whether or not a sharpest focus condition is attained.

9. The focus detecting device according to claim 7, wherein said circuit means is arranged to operate in such a manner that all of said plurality of pairs of the photosensitive elements are first selected to perform said preliminary detection of whether or not a sharper focus condition is attained, and this result of preliminary detection is then utilized in automatically selecting the ones of said plurality of pairs of the photosensitive elements for every lens element which lie at the outer side, so that the outputs of the outer pairs of photosensitive elements are utilized in performing the final detection of whether or not a sharpest focus condition is attained.

10. The focus detecting device according to claim 6 or claim 7 or claim 8 or claim 9, wherein said photosensitive elements are constructed in the form of sensing elements in a solid state image pick-up device, and the outputs of said sensing elements are selectively taken out by said circuit means so that the ones of the pairs of the photosensitive elements are selectively read out.

11. The focus detecting device according to claim 10, wherein those of said sensing elements which correspond to said plurality of pairs of the photosensitive elements are preliminarily specified, and the plurality of pairs of the sensing elements each are provided with a respective gate means, said gate means being selectively rendered operative by said circuit means to selectively read out the plurality of pairs of sensing elements for each lens element by one pair at a time.

12. A system for detecting focusing condition of a lens means with respect to an object, said lens means having an optical axis, said system comprising:
(a) plural groups of a plurality of radiation sensitive elements, each group being applied to sense radiation coming from each of different pairs of virtual exit openings of said lens means, each of said pairs of openings being almost symmetrical with respect to the optical axis and having different optical length therebetween on the virtual exit pupil plane;
(b) selecting means for automatically selecting at least one of said groups of said radiation sensitive elements; and
(c) circuit means receptive of outputs of a selected group of said radiation sensitive elements for detecting the focusing condition of said lens means with respect to said object, said circuit means producing an output whose level changes in accordance with said focusing condition of the lens means with respect to the object; said selecting means being responsive to an output of said circuit means and making the selection on the basis of said output.

13. The system according to claim 12, wherein said plural groups of said plurality of radiation sensitive elements include first and second groups of a plurality of radiation sensitive elements, the first group being applied to sense radiation coming from an outer pair of virtual exit pupil openings and the second group being applied to sense radiation coming from an inner pair of virtual exit pupil openings, said inner pair having a predetermined optical length therebetween smaller than that between said outer pair.

14. The system according to claim 13, wherein said selecting means is arranged to select both of said first and second groups when the level of the output of said circuit means is above a predetermined value and to select only said first group when the level of the output of the circuit means is below said predetermined value.

15. The system according to claim 13, wherein said selecting means is arranged to select said second group when the level of the output of said circuit means is above a predetermined value and to select said first group when the level of the output of the circuit means is below said predetermined value.

16. The system according to claim 14 or 15, wherein the level of said output of said circuit means decreases as defocus amount of said lens means with respect to the object decreases.

17. A system for detecting focusing condition of a lens means with respect to an object, said lens means having an optical axis and a predetermined aperture size, said system comprising:
(a) first and second groups of a plurality of radiation sensitive elements, the first group being applied to sense radiation coming from an outer pair of virtual exit pupil openings of said lens means and the second group being applied to sense radiation coming from an inner pair of virtual exit pupil openings of said lens means, said pair having a predetermined optical length therebetween on the virtual exit pupil plane of the lens means smaller than that between said outer pair;

(b) circuit means receptive of outputs of a selected group of said plurality of radiation sensitive elements selected by following selecting means for detecting focusing condition of said lens means with respect to the object, said circuit means producing an output whose level changes in accordance with the focusing condition of the lens means with respect to the object; and (c) selecting means responsive to the aperture size of said lens means and to the output of said circuit means for selecting said first and second groups with respect to the circuit means, said selecting means selecting only said second group regardless of the output of the circuit means when the aperture size of the lens means is smaller than a predetermined size while selecting said first and second groups selectively on the basis of the output of the circuit means when the aperture size of the lens means is larger than said predetermined size.

18. The system according to claim 17, wherein said selecting means is arranged to select both of said first and second groups when the level of the output of the circuit means is above a predetermined value for the lens means having an aperture size larger than said predetermined size and selecting only said first group when the level of the output of the circuit means is below said predetermined value for the lens means having an aperture size larger than said predetermined value.

19. The system according to claim 17, wherein said selecting means is arranged to select both of said first and second groups when the level of the output of the circuit means is above a predetermined value for the lens means having an aperture size larger than said predetermined size and selecting only said first group when the level of the output of the circuit means is below said predetermined value for the lens means having an aperture size larger than said predetermined size.

20. The system according to claim 18 or 19, wherein the level of said output of said circuit means decreases as defocus amount of said lens means with respect to the object decreases.

* * * * *